United States Patent [19]
Luke et al.

[11] 4,012,059
[45] Mar. 15, 1977

[54] PIPE CONNECTOR
[75] Inventors: Robert R. Luke; Edmund A. Fisher, both of Houston, Tex.
[73] Assignee: Cameron Iron Works, Inc., Houston, Tex.
[22] Filed: Sept. 8, 1975
[21] Appl. No.: 611,259
[52] U.S. Cl. .................................. 285/18; 285/89; 285/317
[51] Int. Cl.² ........................................ F16L 55/00
[58] Field of Search ............... 285/18, 321, 24, 27, 285/89, 317; 254/29 A; 81/57.38

[56] References Cited
UNITED STATES PATENTS

| 3,353,847 | 11/1967 | Brown | 285/321 X |
| 3,361,453 | 1/1968 | Brown et al. | 285/321 |
| 3,378,281 | 4/1968 | Smith | 285/27 |
| 3,459,442 | 8/1969 | De Yarmett et al. | 285/321 |
| 3,502,354 | 3/1970 | Walker | 285/24 |
| 3,606,393 | 10/1971 | Huntsinger et al. | 285/321 X |

Primary Examiner—Thomas F. Callaghan
Attorney, Agent, or Firm—W. F. Hyer; Marvin B. Eickenroht

[57] ABSTRACT

A pipe connector having tubular members whose telescopically interfitting end portions are latched against separation, wherein one of the tubular members is stretchable to preload the latch means and move a shoulder thereon in an axial direction away from the latch means, and a nut is threadedly mounted on the other tubular member to permit a shoulder thereon to be moved against the shoulder on the one member to hold the preload on the latch means.

17 Claims, 6 Drawing Figures

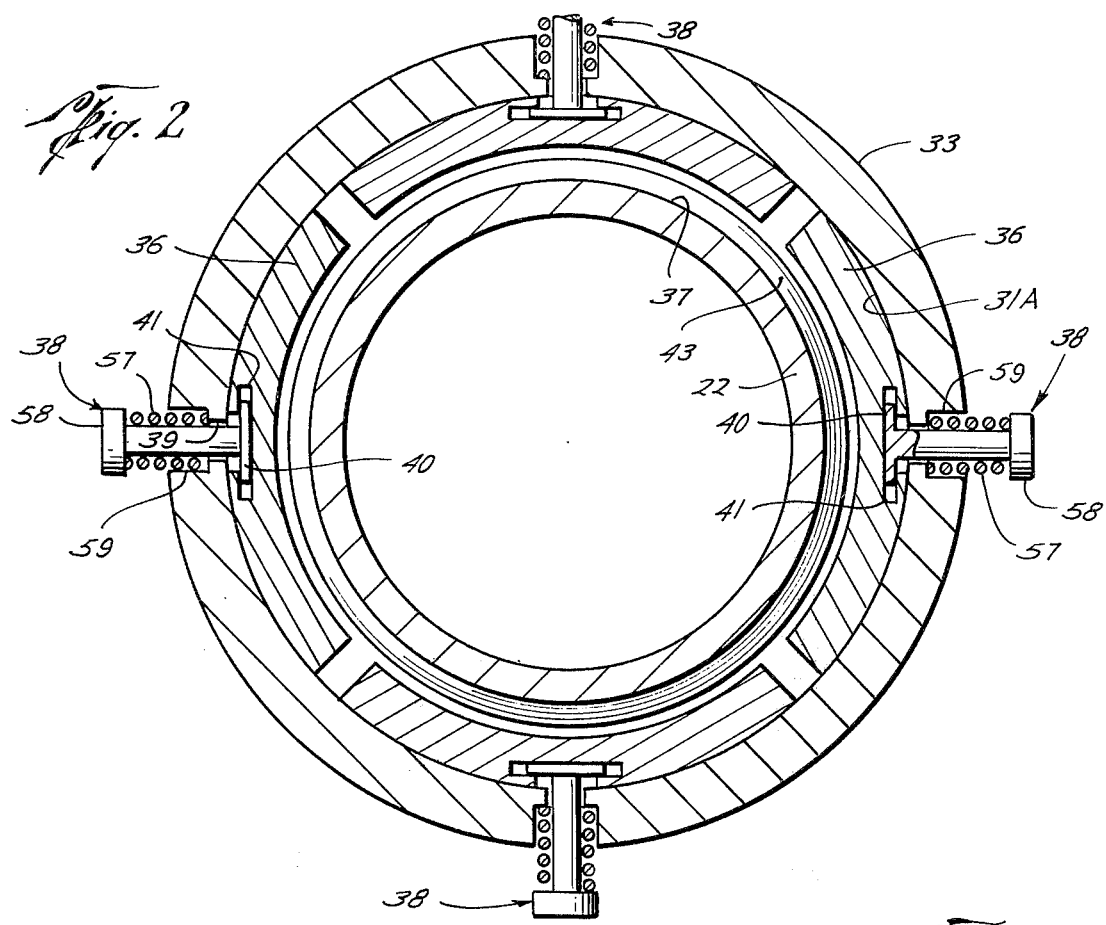
Fig. 2
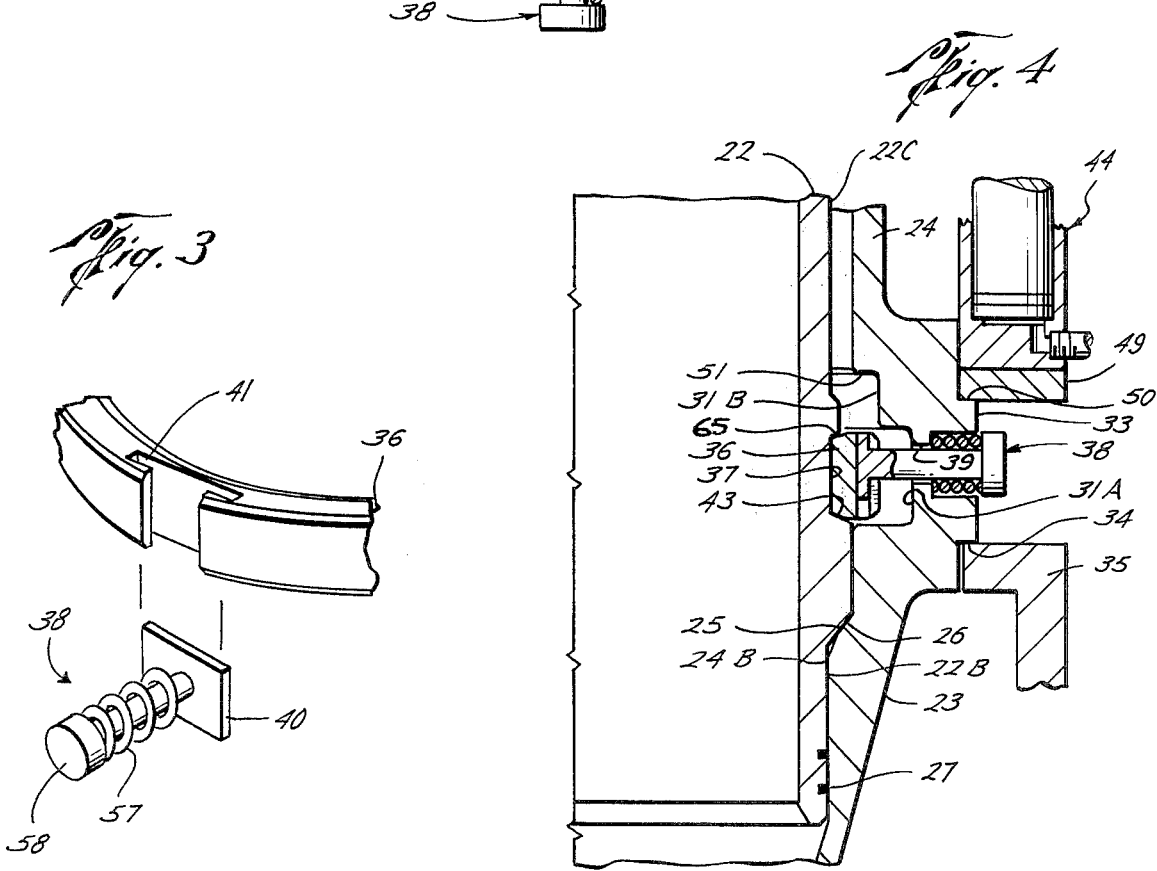
Fig. 3
Fig. 4

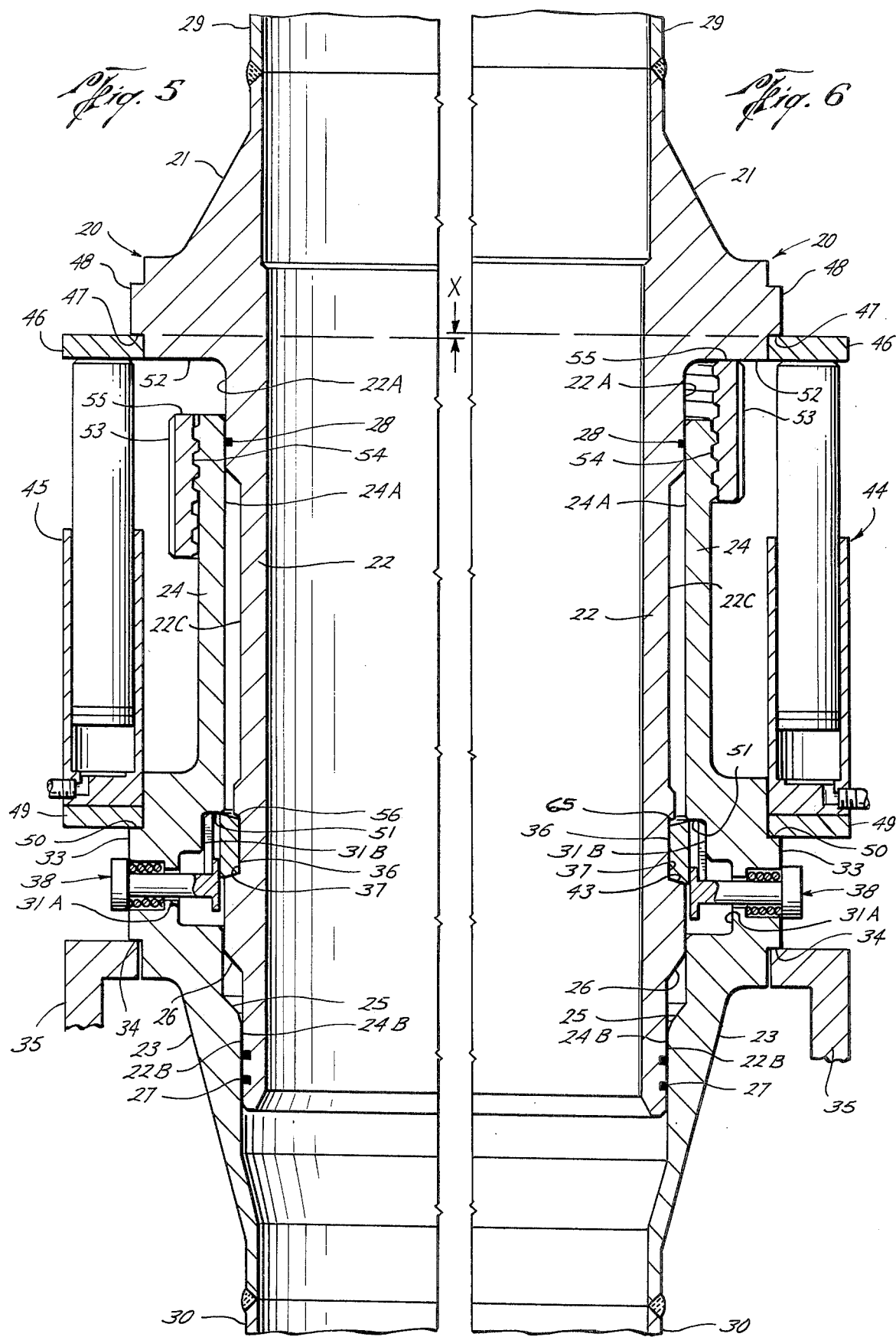

PIPE CONNECTOR

The invention relates generally to a pipe connector of the type in which telescopically interfitting end portions of tubular members are latched against separation when so interfitted. More particularly, it relates to improvements in a pipe connector of this type in which the latch means may be preloaded.

The need for preloading the latch means may arise when the joints of pipe being connected are subjected to a combination of tension loads and oscillatory bending loads. Thus, these loadings cause stress reversals in the latch means, which in turn may cause the connection to fail. Such loadings are a particular problem when the pipe joints are connected as part of a riser pipe extending vertically between a wellhead at an offshore location and a tensioning device aboard a drilling vessel from which drilling operations are being conducted. Thus, the riser pipe, which may extend for a length of several hundred feet, is not only subjected to tension loads as the vessel rises and falls on the water level, but also to bending loads due to the water currents.

It has previously been proposed to connect such pipe joints with connectors having latch means in the form of ring segments carried within an internal groove in the female end portion or box of one tubular member for extension into an external groove in the male end portion or pin of the other member thereof, whereby oppositely facing end surfaces on the groove are engageable with the ring segments to latch the tubular members against separation. More particularly, cams are mounted about the ring segments for moving them into locking position within the external groove, and then wedging against the end surfaces of the groove with a preloading force. However, the extent to which the ring segments may be preloaded is limited, and, in any event, substantially less than the magnitude of stress reversals which might be encountered.

Also, this prior connector is difficult and time-consuming to make up and break out since it requires the manipulation of individual nuts to operate the cams. Furthermore, although the nuts may be manipulated to retract the cams, and thus free the ring segments for return movement to unlatching positions, the segments may become stuck in the external groove about the pin due to corrosion between them and the groove surfaces with which they engage. In this event, it may be necessary to obtain access to the ring segments by cutting into the box of the tubular member in which they are carried.

An object of this invention is to provide a pipe connector of this type in which the latch means may be preloaded to a substantially greater extent than the above-noted connector, and, preferably, to a level above that normally encountered in use of the connector so as to avoid significant stress reversals.

Another object is to provide such a connector in which it is easier and less time-consuming to apply the desired preload to the latch means.

A further object is to provide such a connector in which the latch means is positively urged out of latching position, as the connector is disconnected, so as to overcome forces which might otherwise cause it to be stuck in latched position.

These and other objects are accomplished, in accordance with the illustrated embodiment of the present invention, by a connector of the type described in which an externally manipulatable part is connected to a second of the members for axial movement with respect thereto, and both said part and a first of the members have oppositely facing shoulders which move axially away from one another as one of the members is stretched to preload the latching means. Thus, with the one member so stretched, such part may be manipulated to move the shoulder thereon against the shoulder on the first member so as to hold the preload on the latching means. Preferably, the axially movable part comprises a nut threadedly connected about the second tubular member, so that when it is desired to relieve the preload prior to movement of the latch means to unlatching position, it is merely necessary to add a small amount of stretching force to the one member to permit the nut to be backed off in order to allow the shoulder thereon to move back toward the latch means.

As will be appreciated, the extent to which the latch means is preloaded depends only on the degree to which the one tubular member may be stretched and the ability of the threaded connection of the nut to the other tubular member to hold the one tubular member in its stretched condition. Furthermore, the one member may be stretched by means of a separate device removably disposable about the connector, so that only a single part of the connector itself — namely, the nut — need be manipulated in order to hold the preload.

In the illustrated embodiment of the invention, the first member has a male end portion or pin which fits within a female end portion or box of the second member, and the nut is threadedly connected about the box of the second member to permit the shoulder thereon to be moved toward and away from the shoulder on the first member. Also, the latch means is carried by the box of the second member and comprises ring segments which are moved between latching and unlatching positions by means of rods extending generally radially through the box. More particularly, the inner ends of the rods are connected to the ring segments, and means are provided for resiliently urging the rods radially outwardly, so that, when the preload is released, the rods positively urge the segments out of latching positions. Even if the segments are stuck so tightly in the groove about the male end portion that the urging means cannot withdraw them, the outer ends of the rods provide externally accessible parts to which a withdrawing force may be applied. The positions of the outer ends of the rods also visually indicate whether the ring segments are in latching or unlatching position.

In the preferred and illustrated embodiment of the invention, the groove in the inner diameter of the female end portion or box has relatively deep and shallow sections, with the ring segments being carried in the relatively deep section for disposal opposite the groove in the outer diameter of the male end portion or pin as the pin is stabbed into the box. When the ring segments are moved to an inner position in which they extend into the groove in the pin, their lower ends are positioned for engagement by an end surface on the groove, so that when the one member is moved in a direction toward separation from the other member, the end surface on the groove in the pin lifts the ring segments into the relatively shallow groove section in the box until their upper ends engage with an end surface on the relatively shallow section of the box groove which faces oppositely to the end surface of the groove in the pin so as to latch the tubular members against separation. When in latching position the ring segments fit closely within the relatively shallow section of the box groove, and are thus backed up against movement out of latching positions. The groove in the pin has another end surface which engages the ring segments to return them to a position opposite the relatively deep groove section in the box, when the stretch in the one tubular member is relieved by movement of the nut in the opposite direction, whereby the ring segments are free to move outwardly to unlatched positions.

In the drawings:

FIG. 2 is a cross-sectional view of the connector, as seen along broken line 2—2 of FIG. 1;

FIG. 3 is an exploded perspective view of a portion of one of the ring segments and a rod connectible thereto;

FIG. 4 is a partial sectional view of the connector, similar to the righthand side of FIG. 1, but with the ring segments moved to its inner latching position within a groove about the pin;

Figure 1:
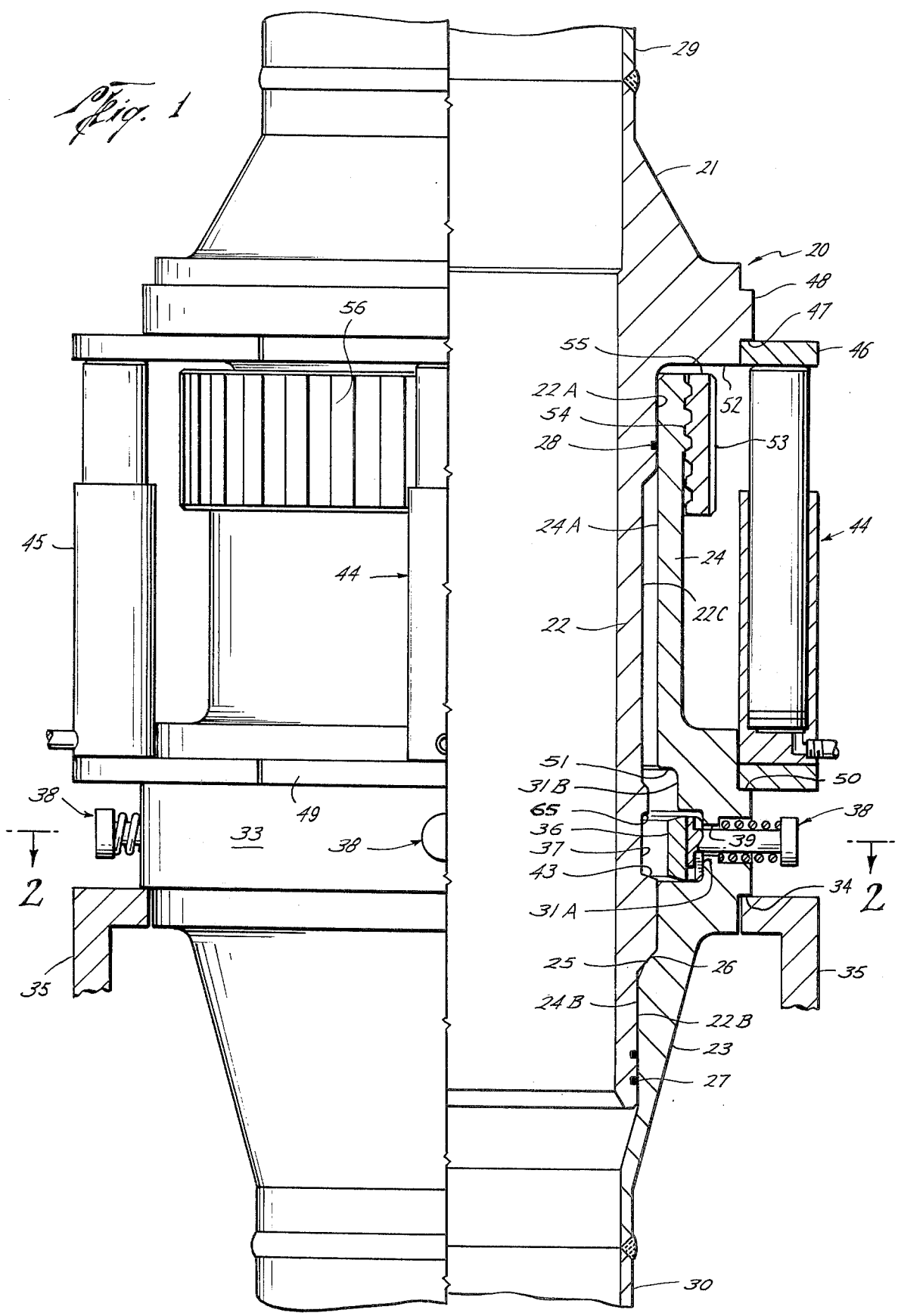
FIG. 1 is a side view, partly in elevation and partly in section, of a connector constructed in accordance with the present invention, with the pin of a first tubular member telescopically received with the box of a second tubular member, and the ring segments in its outer unlatched position within a relatively deep section of a groove about the box.

FIG. 5 is a vertical sectional view of the left half of the connector, with the first tubular member lifted to raise the ring segments into latching position within a relatively shallow section of the groove in the box; and FIG. 6 is a vertical sectional view of the right half of the connector, with the first tubular member stretched by the further lifting in order to preload the latch means, and the nut on the second tubular member moved upwardly to engage the downwardly facing shoulder about the first tubular member so as to hold the preload.

With reference now to the details of the drawings, the overall connector, which is indicated in its entirety by reference character 20, includes a first tubular member 21 having a male end portion or pin 22, and a second tubular member 23 having a female end portion or box 24. The upper end of the first tubular member 21 is welded or otherwise connected to a pipe 29, and the lower end of the second tubular member 23 is welded or otherwise connected to a pipe 30. As previously described, the connector of the present invention has particular utility in connecting pipe joints of a riser pipe, although the invention is not limited to use of the connector for this purpose.

Pin 22 has upper and lower outer cylindrical portions 22A and 22B which fit telescopically within upper and lower inner cylindrical portions 24A and 24B in the bore of box 24. As shown, the lower portions are of smaller diameter than the upper portions to facilitate stabbing of the pin into the box, and the outer portion 22A of the pin is relieved at 22C. As the pin is stabbed into the box, a shoulder 26 on the lower end of upper cylindrical portion 22A of the pin engages a seat 25 provided by the upper end of cylindrical portion 24B of the bore through the box. With the pin and box telescopically interfitted, as described, seal rings 27 about lower portion 22B of the pin sealingly engage bore portion 24B about the lower end of the box 24, and a seal ring 28 about upper portion 22A of the pin sealingly engages bore portion 24A about the upper end of the box.

The second tubular member 23 is provided with an annular enlargement 33 generally intermediate its upper and lower ends. A downwardly facing shoulder 34 about the enlargement is adapted to be supported in an upright position on a pedestal 35 as pin 22 is lowered into telescopically interfitting relation with the box. The pedestal may comprise a conventional spider installed on an offshore drilling vessel in position to permit the riser pipe sections to be lowered therethrough as they are made up with the connectors 20.

A groove formed in the inner diameter of enlarged portion 33 includes a lower, relatively deep section 31A and an upper relatively shallow section 31B, and a groove 37 formed about the outer diameter of the pin is disposed radially opposite the deep groove portion when the pin is lowered into the position of FIG. 1. Latch means comprising a plurality of ring segments 36 are carried within the deep section of the groove for radial movement between an outer position in which they are withdrawn from portion 24A of the bore of the box, so as to permit the pin 22 to be moved downwardly therepast into the position shown in FIG. 1, and an inner position wherein they are disposed within groove 37 in the outer diameter of pin 22, as shown in FIG. 4. As shown in FIG. 2, the opposite ends of the ring segments of the latch means are so spaced apart, in their outer positions, as to permit them to move close together, and thereby provide a substantially full circle of ring segments within groove 37, in their inner positions.

The ring segments 36 are moved inwardly to their inner positions by means of rods 38 carried within and extending generally radially through holes 39 in the enlarged portion 33 of the box. More particularly, each rod has a flange 40 on its inner end which fits within a T-shaped slot 41 in the outer side of the ring segment 36. In this way, the ring segments are connected to the rods not only for radial movement between inner and outer positions, but also for vertical sliding with respect thereto in a direction axially of the tubular members. More particularly, and as will be described to follow, this connection is maintained as the ring segments are raised into latching position within a relatively shallow groove section 31B above deep section 31A.

The ring segments are so raised by lifting of tubular member 21, which raises lower end surface 43 of groove 37 into engagement with the lower ends of ring segments 36. As the ring segments are moved upwardly into groove section 31B, their upper ends are brought into engagement with the upper end surface 51 of relatively shallow groove portion 31B, whereby the ring segments are held between groove end surfaces 43 and 51 to latch the tubular members against separation.

The first tubular member may be lifted in any suitable manner, such as by means of a device indicated at 44 to include vertically extendible and contractible fluid operated actuators 45 mounted in force-transmitting relation between oppositely facing shoulders on the first and second tubular members, and thus in position to lift the first member when extended. Thus, as shown, the opposite ends of the actuators are disposed between an upper ring 46 engageable with a downwardly facing shoulder 47 about a radially enlarged portion 48 of the first tubular member and a lower ring 49 supported on an upwardly facing shoulder 50 about enlarged portion 33 of the second tubular member. More particularly, the cylinder of each actuator 45 is supported on ring 49, and the upper end of the piston rod of each actuator is engageable with ring 46. Thus, upon the introduction of hydraulic fluid beneath pistons in the cylinders, the rods are extended to lift the first tubular member with respect to the second. As will be appreciated, the rings may be made in segments so as to permit them to be disposed in or removed from the position shown.

First tubular member 21 has an axially enlarged portion 48 whose lower end provides a downwardly facing shoulder 52 which is a short distance above the upper end of box 24 of the second tubular member prior to lifting of member 21. As can be seen from FIG. 5, lifting the first tubular member to move the ring segments into locking position will in turn lift shoulder 52 a further distance above the upper end of box 24. Since, at this stage, the latch means latches the tubular members against separation, still further extension of the rods of the actuators 45 will stretch the first tubular member (see distance "X" in FIG. 6) so as to impose a preload on the latch means.

When the desired preload has been applied to the latch means, it is held thereon by means of a nut 53 threadedly connected at 54 about the upper end of the box 24, and thus in position to move a shoulder 55 on its upper end into engagement with the shoulder 52, as shown in FIG. 6, upon rotation of the nut in one direction by means of a wrench engageable with a knurled surface 56 about its outer circumference. As previously described, this preload is thus held on the latch means so that the lifting device 44 may be removed for use in stretching a tubular member of another connector during makeup of a riser pipe or the like.

As can be seen from FIG. 6, seal rings 27 are so located about the portion 22B of the pin, and seal ring 28 is so located about portion 22A thereof, as to maintain sealing contact with bore portions 24B and 24A of the box, respectively, when the latch means is so preloaded. Thus, in use of the connector, seal rings 27 prevent the escape of fluid from within the connector, and seal ring 28 prevents debris from falling downwardly into the annular space between the pin and box in which the latch means is located.

When the connector is to be broken out, it is merely necessary to increase slightly the lifting force of device 44 so as to permit nut 53 to be rotated in an opposite direction in order to lower surface 55, and thus relieve the stretch in the first tubular member so that it may move downwardly from the position of FIG. 5 to that of FIG. 4. As the first member moves downwardly, an upper end surface 65 on groove 37 engages with the upper ends of ring segments 36 so as to lower them back into positions opposite the relatively deep groove section 31A. As previously described, flanges 40 on the inner ends of rods 38 maintain their connection with slots 41 during this vertical movement of the first member, so that, when the ring segments have been returned to the position of FIG. 4, the ring segments are free to move from their inner latching positions to their outer unlatching positions, as shown in FIG. 1.

A coil spring 57 is disposed about each rod intermediate an enlarged head 58 on the outer end of the rod and the inner end of a counterbore 59 at the outer end of each hole 39 so as to resiliently urge the rod, and thus the ring segment connected thereto, to their outer positions. As previously described, the outwardly directed force provided by the spring 57 is especially useful in retracting ring segments which might otherwise be stuck within the groove 37.

Although spring 57 will thus resist the inward movement of the rod necessary to move the ring segments to the inner position of FIG. 4, the inward force necessary for this purpose may be provided by a suitable tool. Of course, when the ring segments are moved inwardly and then lifted into groove section 31B, this force is no longer required, so that any such tool may be removed for use elsewhere.

As shown, the hole 39 has a relatively loose fit about the intermediate portion of the rod 58 so as to permit the annular space between seal rings 25 and 31 to breathe. If desired, the annular space between the pin and box may be packed with grease in order to exclude debris therefrom.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe connector, comprising first and second tubular members having telescopically interfitting end portions, means for latching the end portions of the tubular members against separation when so interfitted, means for sealing the end portions with respect to one another when so latched, one of said members being stretchable so as to preload the latching means, and an externally manipulatable part connected to the second member for axial movement with respect thereto, said part and said first tubular member having oppositely facing shoulders which move axially away from one another as said one member is stretched, whereby said part may be manipulated to move the shoulder thereon against the shoulder on the first member so as to hold the preload on the latching means.

2. A pipe connector of the character defined in claim 1, wherein said part comprises a nut threadedly connected to the second member.

3. A pipe connector of the character defined in claim 1, wherein the end portion of the first member fits within the end portion of the second member.

4. A pipe connector of the character defined in claim 3, wherein the latching means is carried by the end portion of the second member for fitting within a groove in the end portion of the first member.

5. A pipe connector, comprising first and second tubular members having telescopically interfitting end portions, means for latching the end portions of the tubular members against separation when so interfitted, means for sealing the end portions with respect to one another when so latched, the first tubular member being stretchable so as to preload the latching means, and an externally manipulatable part connected to the second tubular member for axial movement with respect thereto, said first member having a shoulder which is movable in an axial direction away from an oppositely facing shoulder on said part, upon stretching of said first tubular member, so that the shoulder on said part may be moved against the shoulder on said first member to hold the preload on said latching means.

6. A pipe connector of the character defined in claim 5, wherein the end portion of the first tubular member fits within the end portion of the second tubular member.

7. A pipe connector of the character defined in claim 6, wherein the latching means is carried by the end portion of the second tubular member which fits about the end portion of the first tubular member.

8. A pipe connector of the character defined in claim 5, wherein said part comprises a nut which is threadedly connected to said second tubular member.

9. A pipe connector, comprising first and second tubular members having telescopically interfitting male and female end portions, respectively, the male end portion having a groove in its outer diameter and the female end portion having a groove in its inner diameter, latch means carried in the groove in the female end portion for radial movement between an outer position in which said latch means may be disposed opposite the groove in the male end portion, and an inner position in which said latch means extends into the groove in said male end portion, said grooves having oppositely facing end surfaces engageable with the latch means, when in its inner position, to prevent said tubular members from separating, means for sealing the end portions with respect to one another when so latched, said first member being stretchable so as to preload the latching means, and an externally manipulatable part connected to the second member for axial movement with respect thereto, said part and said first tubular member having oppositely facing shoulders which move axially away from one another as said first member is stretched to preload the latch means, whereby said part may be manipulated to move the shoulder thereon against the shoulder on the first member so as to hold the preload on the latch means.

10. A pipe connector of the character defined in claim 9, wherein the grooves extend about the circumferences of the end portions of the tubular members, and the latch means comprises ring segments having their opposite ends disposed close to one another in their latching positions.

11. A pipe connector of the character defined in claim 10, including rods extending through the second tubular member and connected to the ring segments for moving them between inner and outer positions.

12. A pipe connector of the character defined in claim 11, including means resiliently urging said rods and ring segments radially outwardly.

13. A pipe connector of the character defined in claim 9, wherein said part comprises a nut which is threadedly connected to said second tubular member.

14. A pipe connector, comprising a first tubular member having a pin, a second tubular member having a box into which the pin is telescopically interfitted, the pin having a groove in its outer diameter and the box having a groove with relatively deep and shallow sections in its inner diameter, latch means carried in the relatively deep groove section in the box for radial movement between an outer position in which it may be disposed opposite the groove in the pin, and an inner position in which said latch means which is adapted to extend into the groove in said pin, the groove in the pin having an end surface engageable with the latch means, when in its inner position, so as to move it axially into the relatively shallow groove section in the box when the tubular members are moved relatively in an axial separating direction, said shallow groove section fitting closely about the latch means and having an end surface which faces oppositely to the end surface on the groove in the pin so as to prevent said tubular members from separating, means for sealing the pin and box with respect to one another when so latched, said first member being stretchable so as to preload the latching means, and an externally manipulatable part connected to one member for axial movement with respect thereto, said part and said other member having oppositely facing shoulders which move axially away from one another as the first member is stretched to preload the latching means, whereby said part may be manipulated to move the shoulder thereon against the shoulder on the other member so as to hold the preload on the latching means.

15. A pipe connector of the character defined in claim 14, wherein the grooves extend about the circumferences of the pin and the box of the tubular members, and the latch means comprises ring segments having their opposite ends close together in latching position.

16. A pipe connector of the character defined in claim 15, including rods extending generally radially through the box, and means connecting the ring segments to the inner ends of the rod for moving them between inner and outer positions and for sliding with respect thereto in a direction axially of said tubular members.

17. A pipe connector of the character defined in claim 14, wherein said part comprises a nut which is threadedly connected to the one member to permit the shoulder thereon to be moved in the opposite direction to release the stretch in the first tubular member, and said groove in the pin has another surface for engaging the latch means to return it to a position opposite the relatively deep groove section in the box when the stretch is relieved.

* * * * *